(12) United States Patent
Kato et al.

(10) Patent No.: US 8,032,619 B2
(45) Date of Patent: Oct. 4, 2011

(54) ENVIRONMENT INFORMATION SERVER

(75) Inventors: Eiko E. Kato, Foster City, CA (US);
Seth C. H. Luisi, Foster City, CA (US);
Glen Van Datta, Foster City, CA (US)

(73) Assignee: Sony Computer Entertainment America LLC, Foster City, CA (US)

( * ) Notice: Subject to any disclaimer, the term of this patent is extended or adjusted under 35 U.S.C. 154(b) by 1201 days.

(21) Appl. No.: 10/729,573

(22) Filed: Dec. 3, 2003

(65) Prior Publication Data

US 2004/0210651 A1 Oct. 21, 2004

Related U.S. Application Data

(60) Provisional application No. 60/463,674, filed on Apr. 16, 2003.

(51) Int. Cl.
*G06F 15/173* (2006.01)
*G06F 15/16* (2006.01)

(52) U.S. Cl. .......... 709/223; 709/203; 709/219

(58) Field of Classification Search .......... None
See application file for complete search history.

(56) References Cited

U.S. PATENT DOCUMENTS

| | | | |
|---|---|---|---|
| 4,787,051 A | 11/1988 | Olson | |
| 4,843,568 A | 6/1989 | Krueger | |
| 5,128,671 A | 7/1992 | Thomas, Jr. | |
| 5,528,265 A | 6/1996 | Harrison | |
| 6,012,096 A * | 1/2000 | Link et al. | 709/233 |
| 6,152,824 A * | 11/2000 | Rothschild et al. | 463/42 |
| 6,157,368 A | 12/2000 | Faeger | |
| 6,375,572 B1 | 4/2002 | Masuyama | |
| 6,487,583 B1 * | 11/2002 | Harvey et al. | 709/204 |
| 6,553,515 B1 * | 4/2003 | Gross et al. | 714/47 |
| 6,641,481 B1 * | 11/2003 | Mai et al. | 463/42 |
| 6,848,997 B1 * | 2/2005 | Hashimoto et al. | 463/42 |
| 7,123,608 B1 * | 10/2006 | Scott et al. | 370/353 |
| 7,134,961 B2 * | 11/2006 | Hora | 463/42 |
| 7,155,515 B1 * | 12/2006 | Brown et al. | 709/226 |
| 7,457,279 B1 * | 11/2008 | Scott et al. | 370/352 |
| 7,803,052 B2 * | 9/2010 | Multerer et al. | 463/42 |
| 2001/0044339 A1 * | 11/2001 | Cordero et al. | 463/42 |
| 2002/0002074 A1 * | 1/2002 | White et al. | 463/25 |
| 2002/0013838 A1 * | 1/2002 | Kushida et al. | 709/223 |
| 2002/0085097 A1 | 7/2002 | Colmenarez et al. | |
| 2003/0115258 A1 * | 6/2003 | Baumeister et al. | 709/203 |
| 2004/0063497 A1 * | 4/2004 | Gould | 463/42 |
| 2004/0212589 A1 | 10/2004 | Hall et al. | |

OTHER PUBLICATIONS

Bolt, R.A., "Put-that-there": voice and gesture at the graphics interface, Computer Graphics, vol. 14, No. 3 (ACM SIGGRAPH Conference Proceedings) Jul. 1980, pp. 262-270.

DeWitt, Thomas and Edelstein, Phil, "Pantomation: A System for Position Tracking," Proceedings of the $2^{nd}$ Symposium on Small Computers in the Arts, Oct. 1982, pp. 61-69.

* cited by examiner

*Primary Examiner* — John B. Walsh
(74) *Attorney, Agent, or Firm* — Frommer Lawrence & Haug LLP; William S. Frommer; Paul A. Levy (57) ABSTRACT

Methods and apparatus implementing techniques for providing network environment information. In one implementation, a environment information server includes: a server controller; a network connection connected to said server controller; an environment information database connected to said server controller for storing data for one or more network environments; and a request handler connected to said server controller for processing requests received through said network connection; wherein said request handler exchanges data with said environment information database in the course of processing a received request.

48 Claims, 5 Drawing Sheets

ENVIRONMENT INFORMATION SERVER

This application claims the benefit of U.S. provisional patent application 60/463,674, filed Apr. 16, 2003, the disclosure of which is incorporated herein by reference.

BACKGROUND

In some information services, a provider deploys multiple servers accessible to clients through a network, such as the Internet. Each of the servers may be in different physical locations and operating under different network conditions. As a result, the conditions for network access by a particular client may vary from server to server. For example, the latency or delay in communication between a client and a server that is physically close to the client may be less than the latency in communication between the client and a different server that is physically farther away from the client. In another example, the number of clients accessing a server can affect the speed and performance of the server and so a server with fewer current clients may provide better performance. Accordingly, it can be desirable for a client to select one of the deployed servers with favorable network conditions relative to the client.

SUMMARY

The present invention provides methods and apparatus implementing techniques for providing network environment information. In one implementation, a environment information server includes: a server controller; a network connection connected to said server controller; an environment information database connected to said server controller for storing data for one or more network environments; and a request handler connected to said server controller for processing requests received through said network connection; wherein said request handler exchanges data with said environment information database in the course of processing a received request.

In another implementation, a method of providing environment information includes: receiving an environment information request from a client through a network connection; retrieving environment information for each of two or more environments from an environment database; generating an environment report according to said retrieved environment information; and sending said environment report to said client through said network connection; wherein environment information for an environment includes network information for the environment, status information for the environment, and user count information for the environment.

In another implementation, a method of accessing environment information includes: sending an environment information request from a client to an environment information server through a network connection; and receiving from said environment information server an environment report including environment information for two or more environments; wherein environment information for an environment includes network information for the environment, status information for the environment, and user count information for the environment.

DETAILED DESCRIPTION

The present invention provides methods and apparatus implementing techniques for providing network environment information. In one implementation, an environment information server stores environment information for multiple network environments in a database. Upon receiving a request for environment information from a client, the environment information server builds an environment report using environment information retrieved from the database and sends the report to the client. The client uses the environment report to determine to which environment to connect.

An example of one implementation is described below. Additional variations are described after this example.

In one example of one implementation, an environment information server and three network environments are connected to the Internet. Each environment includes multiple interconnected computer systems and supports one or more online games.

The environment information server includes a database storing environment information for each of the environments supported by the environment information server. The environment information for an environment indicates a name of the environment, a description of the environment, the status of the environment, network information for communicating with the environment, the current number of clients connected to the environment, and the maximum number of clients that are permitted to be connected to the environment.

A client system is also connected to the Internet. The client system is a network-enabled game console, such as a PlayStation 2™ offered by Sony Computer Entertainment Inc.™ For a user to play an online game through one of the environments, the user will connect the game console to one of the environments through the Internet. Before connecting to one of the environments, the game console connects to the environment information server to retrieve environment information for the available environments. The game console requests environment information from the environment information server. The environment information server retrieves environment information from the database and builds an environment report for the game console. The environment information server sends the environment report to the game console. The game console closes the connection to the environment information server and presents information from the environment report to the user to allow the user to select one of the environments. The user reviews the information presented by the game console and selects the environment most desirable to the user (e.g., the environment which appears to have the best performance at this time). After receiving a selection from the user, the game console connects to the selected environment and begins the online game process.

In this way, the user of the game console has access to information describing the environments available for an online game through a central source—the environment information server. Rather than contacting each environment directly from the game console, the user can retrieve one set of information to select a desirable environment. In addition, a service provider can deploy multiple environments (e.g., based on geographic separation or language separation) and allow users to connect to an appropriate environment while still allowing users to select to which environment to connect.

Figure 1:
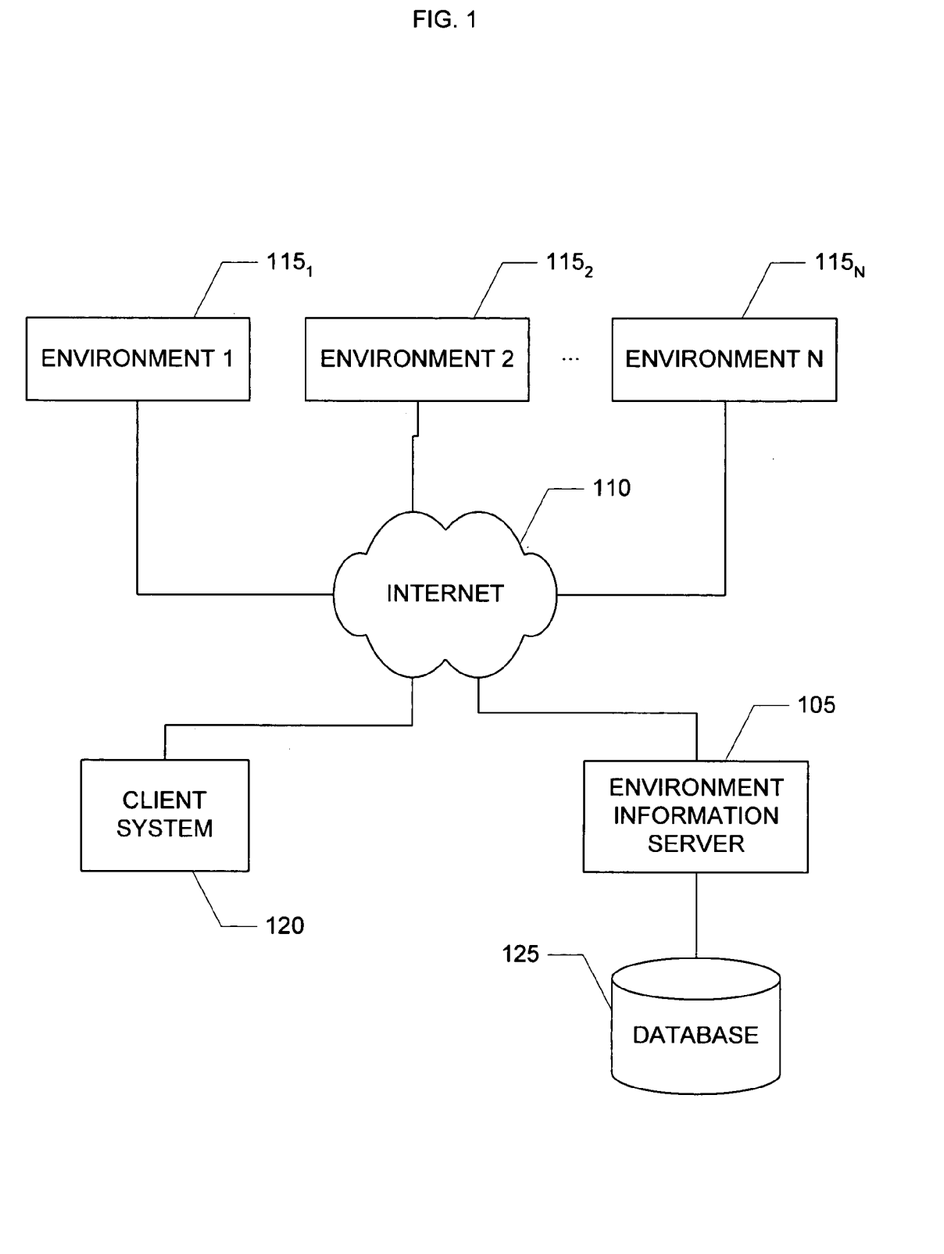
FIG. 1 shows a representation of one implementation of an environment information server connected to a network.

FIG. 1 shows a representation of one implementation of an environment information server 105 connected to a network 110. One or more network environments $115_{1...N}$ and a client system 120 are also connected to the network 110. An environment information database 125 is connected to the environment information server 105.

Each of the environments $115_{1...N}$ includes one more interconnected computer systems providing one more network services to connected clients. In one implementation, the network services include supporting one or more online games. For example, in one implementation, an environment is an online universe supporting an online game. The universe includes: a universe manager for tracking and managing lobby rooms, game information, and players; an authentication server for authenticating clients; a lobby server for supporting the lobby rooms; a proxy server; a database server; and a game server (which may be connected through the proxy server). A user connects to the universe to play the online game using a network-enabled game console (e.g., by connecting to the authentication server for authentication, connecting to the lobby server to access one or more lobby rooms, and then connecting to the game server to play the game). More than one environment can support the same service, however each environment operates independently of the other environments. As a result, a client can connect to one of multiple environments to access a particular service. In addition, different environments may provide the same primary services but provide different ancillary services, such as different advertising.

Depending upon the network conditions and status of the environments, different environments may provide different levels of performance at a given time. For example, a user playing an online game may experience different levels of performance in the game (e.g., different frame rates) from different universes. In one implementation, the environments are physically remote from one another (e.g., on different continents), and so the latency or delay in receiving data from an environment may vary according to the distance between the client and the environment (e.g., due to physical distance and/or network configuration). Similarly, if the network path to an environment from a client is not operating properly or is operating slowly, the performance of that environment for the client may be worse than that for a different environment. In another situation, as the number of clients connected to an environment increases, the load on the computer systems of the environment increases, and so the performance of the environment may degrade. In another situation, one environment providing a desired service may be unavailable (e.g., the computer systems of the environment are disconnected from the network for maintenance or repair), and so a user may need to connect to an alternative environment to access the service.

The environment information server 105 is a network server system including one or more interconnected computer systems. The computer systems of the environment information server 105 are connected forming a local network. Alternatively, the computer systems of the environment information server are integrated into a single system. The environment information server 105 stores environment information for each of the environments $115_{1...N}$ in the environment information database 125. As described below, the environment information server 105 receives requests for environment information from the client system 120 and returns environment reports to the client system 120 using environment information retrieved from the environment information database 125. In another implementation, the environment information server is connected directly to one more environments.

The environment information server 105 periodically polls the environments $115_{1...N}$ to update the environment information for the environments $115_{1...N}$. In one implementation, the environment information server also requests environment information from an environment when the environment information server has received a request for environment information for an environment for which the environment information server has not stored current environment information. In this case, the environment information server requests new environment information from the appropriate environment and stores the updated environment information in the environment information database.

The environment information stored by the environment information server for an environment includes, but is not limited to, information indicating: the name of the environment, a description of the environment (e.g., a text description of the environment), the status of the environment, network information for the environment (e.g., including the fully qualified domain name and the port number for connecting to the environment), user count information for the environment (e.g., the current number of users or clients connected to the environment and/or the maximum number of users or clients that are permitted to be connected to the environment), latency information for the environment (e.g., estimated relative to a sample client or base information for estimating latency relative to the requesting client), performance information for the environment (e.g., estimating response time or data rates such as frame rates), news or announcements for the environment (e.g., upcoming events, announcements by the provider operating the environment, announcements by the provider of a service supported by the environment, available discounts or pricing, advertising), costs or fees for the environment, and a list of available services supported by the environment.

The environment information server 105 prepares an environment report using the environment information stored in the environment information database 125. The environment information server 105 prepares the environment report in response to a request received from the client system 120. In one implementation, the environment information server 105 uses the same format for each environment report (e.g., reporting the same type of information in each report). In one implementation, the environment information server 105 includes a recommendation of which environment $115_{1...N}$ to use based on current conditions of the environments $115_{1...N}$ according to the stored environment information.

In another implementation, the environment information server 105 uses client-specific information included by the client system 120 in the request sent to the environment information server 105 to prepare the environment report. For example, the environment information server 105 derives latency and performance information relative to the specific requesting client system 120 using network information provided by the client system 120. In another example, the environment information server 105 prepares news or announcements specific to the requesting client system 120 using client identification information provided by the client system 120 (e.g., providing announcements targeted to the client system based on one more subscriptions corresponding to the client system or a group to which the client system belongs). In another example, the environment information server 105 prepares a recommendation of which environment $115_{1...N}$ best matches criteria supplied in the request from the client system 120. In another example, the environment information server 105 builds a list of other users accessing the environment using client identification information provided by the client system 120 (e.g., building a buddy list).

The network 110 is a data network, such as the Internet. In another implementation, the network 110 is a private network, such as a corporate intranet. In another implementation, part or the entire network is a wireless network.

The client system 120 is a network-enabled computer system, such as a game console with a network adapter, or a laptop computer having a wireless modem providing a wireless connection to the network 110. The client system 120 exchanges data with the environment information server 105 through the network 110. In another implementation, the client system is connected directly to the environment information server.

The environment information database 125 is a typical database system, such as a relational database. The environment information database 125 receives requests for data from the environment information server 105 and provides stored environment information to the environment information server 105. In another implementation, the environment information database is connected to the environment information server through the network. Alternatively, the environment information database is included within the environment information server.

Figure 2:
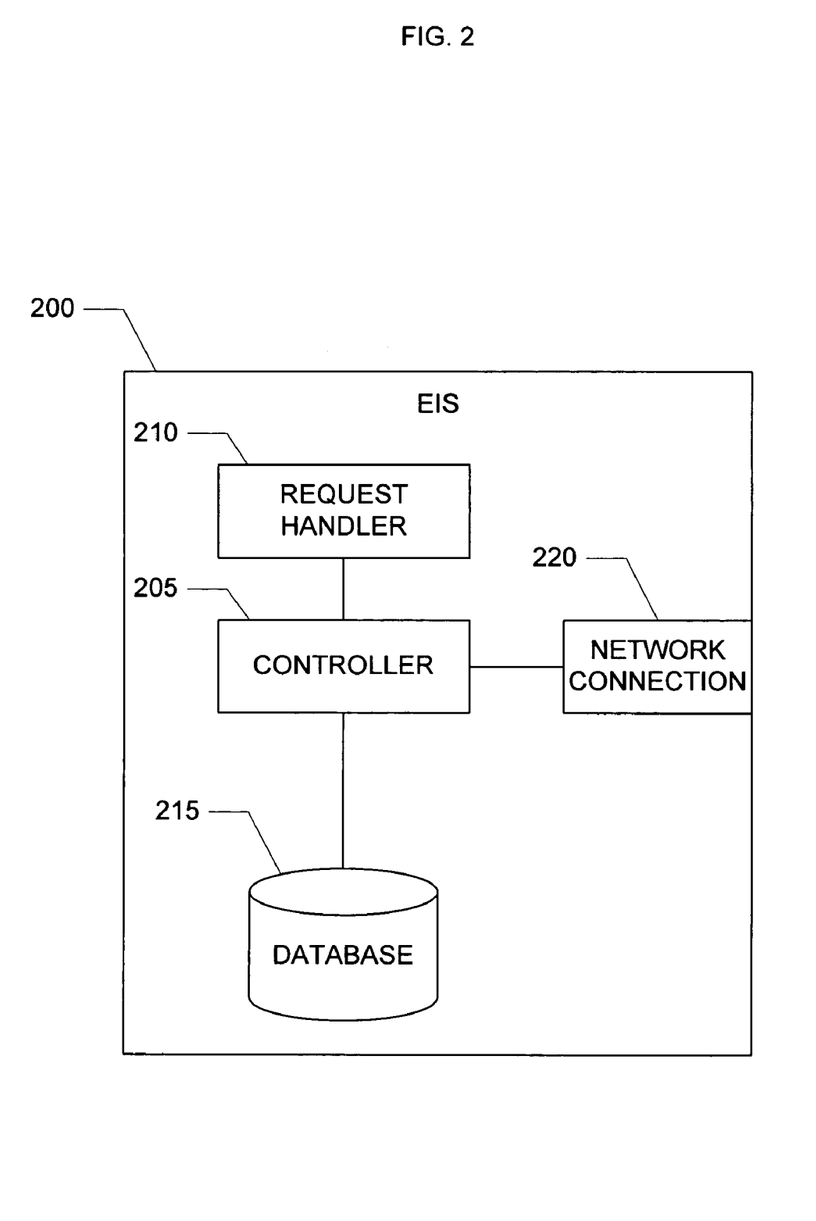
FIG. 2 is a block diagram of one implementation of an environment information server.

FIG. 2 is a block diagram of one implementation of an environment information server 200. The environment information server 200 includes a server controller 205, a request handler 210, an environment information database 215, and a network connection 220. The server controller 205 controls the operation of the environment information server 200 and its components. The other components of the environment information server are connected to the server controller 205. The network connection 220 is connected to a network, such as the Internet. The environment information server 200 communicates with clients and environment through the network connection 220.

The request handler 210 processes requests for environment information received from clients (e.g., when the environment information server 105 receives a request for environment information from the client system 120, as shown in FIG. 1). The request handler 210 retrieves environment information from the environment information database 215 according to the received request. The request handler 210 builds an environment report using the retrieved environment information. In one implementation, the request handler 210 derives data from the environment information and from information included in the request from the client. In another implementation, the request handler returns the retrieved environment information unmodified to the client.

In other implementations, the configuration of the environment information server can be different. For example the systems of the environment information server can be discrete network systems interconnected in a local network, or interconnected across a broader network. In another example, the environment information database can be external to the environment information server (e.g., as shown in FIG. 1). In another example, the components of the environment information server are interconnected using a common bus structure.

Figure 3:
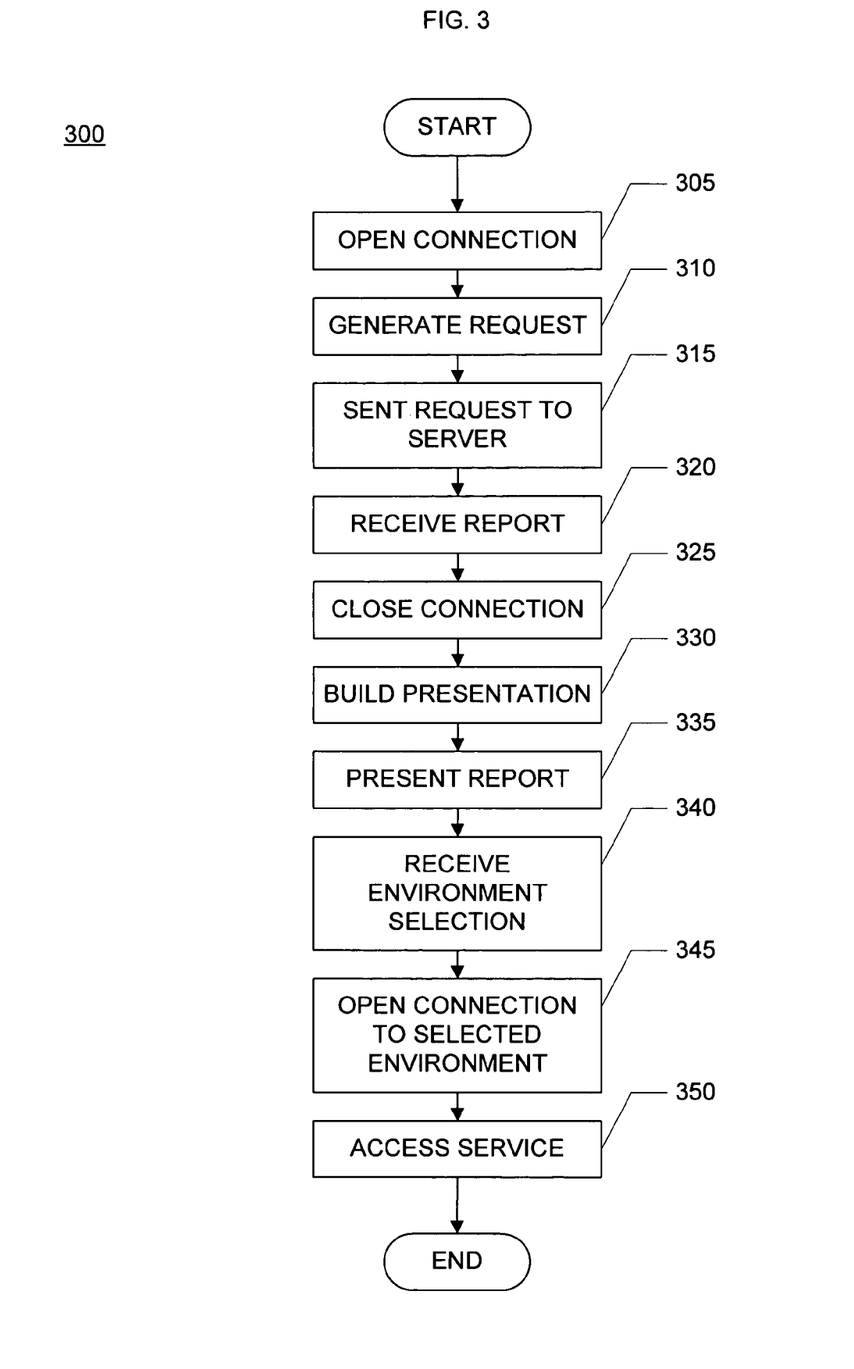
FIG. 3 shows a flow chart of one implementation of accessing environment information.

FIG. 3 shows a flow chart 300 of one implementation of accessing environment information. Initially, a client system is connected to an environment information server through a network. The environment information server stores environment information for one or more environments in a connected environment information database.

The client opens a connection to the environment information server, block 305. The environment information server confirms the connection. In one implementation, the client system and environment information server establish a secure connection, such as by using encryption. In another implementation, upon opening the connection, the environment information server confirms that the client system is authorized to access the environment information server, such as by checking a client identifier (e.g., identifying a specific client system or a type of client system, such as a specific product) or requesting a password or key. In another implementation, if the connection to the confirming information server is unavailable or fails, the client system has a default environment to which to connect.

The client generates an environment information request, block 310. The environment information request indicates that the client system is requesting environment information for available environments from the environment information server. In one implementation, the client system includes in the environment information request information for the environment information server to use in building a response to the request. For example, in one implementation, the client system includes client identification information in the request. In another example, the client system includes network information for the client system in the request, such as the network address of the client system. In another example, the client system includes one more criteria for selecting or recommending an environment.

The client sends the environment information request to the environment information server, block 315. The client system sends the request to the environment information server through the network. The environment information server processes the request and builds an environment report as described below referring to FIG. 4.

The client receives the environment report from the environment information server, block 320. The client system receives the environment report through the network. After receiving the environment report, the client closes the network connection to the environment information server, block 325.

The client builds an environment presentation using the received environment report, block 330. The environment presentation presents information from the environment report formatted according to the configuration of the client system. The environment presentation includes a request for a selection of the environment by a user, such as through a list of available environments and corresponding environment information (e.g., presenting a name, description, status and performance information for each available environment). In one implementation, the environment presentation includes a recommendation of an environment by the environment information server or the client system. The recommendation can be based upon criteria used by the environment information server, the client system, or criteria provided by the user. In one implementation, the client system uses stored user preferences to build the environment presentation. For example, the client system can provide a recommendation for selecting an environment based on previously entered user preferences. After building the environment presentation, the client presents the environment presentation to a user, block 335. The client presents the environment presentation through a user interface, such as a display connected to or part of the client system.

The client receives a selection of the environment by the user, block 340. The user selects one of the available environments as presented in the environment presentation using the user interface of the client system, such as a keypad or remote control (e.g., using a game controller for a game console).

The client opens a network connection to the selected environment, block 345. The client system uses the network information provided by the environment information server in the environment report to connect to the selected environment. After establishing a connection to the environment, the client system accesses services provided by the connected environment, block 350. In one implementation, the environment provides an online game and once the client system has connected to the environment, the user of the client system can begin to play the provided game.

In another implementation, the client system automatically connects to a recommended environment instead of requesting a selection by the user. In this case, the environment information server or the client system selects an environment using the environment information and the client system opens a connection based upon the selection. In one implementation, the access to the environment information server is transparent to the user. For example, the user requests access to a specified online game. The client system automatically generates and sends an environment information request to the environment information server to determine which environment provides the requested game and which of those environments will provide the most desirable level of performance. The determination can be made by the game console or the environment information server. The client system then automatically connects to the indicated environment. From the user's point of view, the user requested access to a game and a connection to an environment providing the game was opened by the client system automatically. In this case, the user is not necessarily informed of the number or presence of various available environments.

Figure 4:
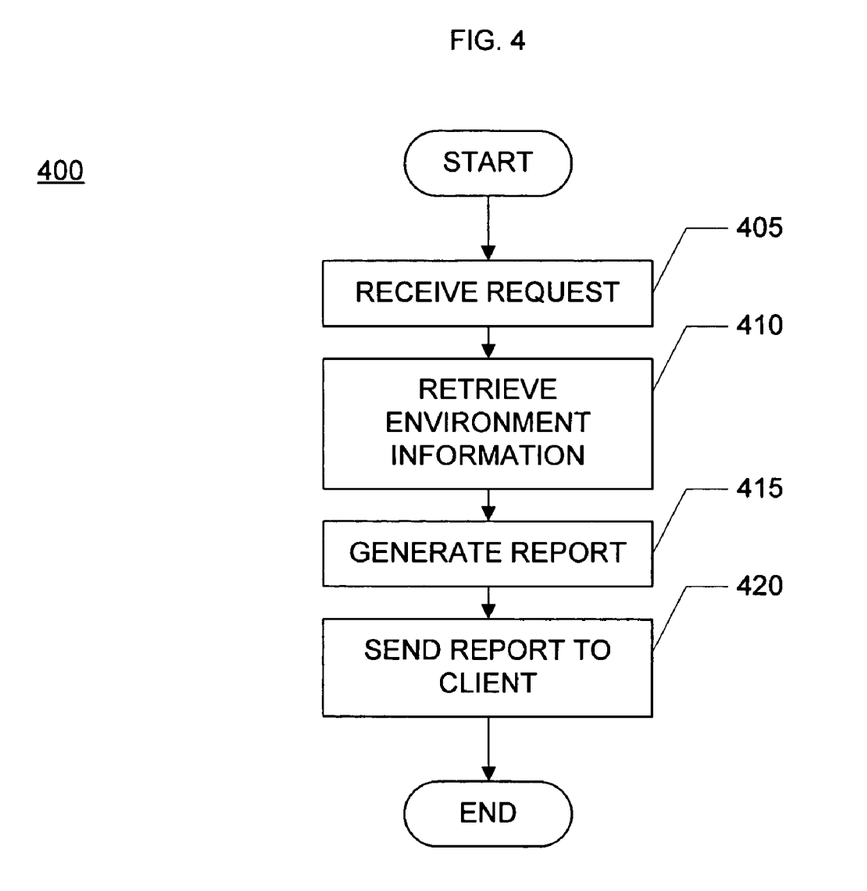
FIG. 4 is a flow chart of one implementation of retrieving environment information.

FIG. 4 is a flow chart 400 of one implementation of retrieving environment information. Initially, an environment information server is connected to an environment information database and is connected to a client system through a network. The client system has generated an environment information request and sent the request to the environment information server through the network, as described above referring to block 315 of FIG. 3.

The environment information server receives the environment information request from the client system, block 405. As described above, the environment information request is a request for environment information for available environments. In one implementation, the environment information request indicates information for the environment information server to use to select environment information and build the environment report, such as information indicating a specific service, client identification information, client network information, and/or criteria for selecting an environment.

The environment information server retrieves environment information from the environment information database, block 410. The environment information server retrieves environment information for each of the available environments from the environment information database. The environment information server sends a query to the database, and the database returns environment information matching the query. In one implementation, the environment information server retrieves information according to the environment information request, such as by building a database query for the environment information database using criteria in the environment information request. In this case, the environment report can reflect environment information specific to the requesting client or user. In one implementation, if the environment information database does not have environment information matching the environment information request or the retrieved environment information is not current, the environment information server requests new environment information from the appropriate environment(s). The environment information server determines whether environment information is current or not by comparing timestamps of the data with the current time and then comparing the difference with a threshold.

The environment information server builds an environment report using the retrieved environment information, block 415. The environment report includes information identifying one or more available environments and network information for connecting to the identified environments (e.g., a domain name and port number). In one implementation, the environment information server uses a standard format for generating the environment report. In another implementation, the environment information server customizes the environment report using information from the environment information request. For example, the environment information server builds the environment report according to a user language indicated in the environment information request or indicated by client identification information. The environment information server can filter or modify the retrieved environment information or derive data from the environment information for the report. For example, the environment information server estimates latency or performance using network information for each environment and using network information for the client system. In another example, the environment information server estimates latency or performance using a user count for each of the environments (e.g., reflecting the current load of each of the environments). In another implementation, the environment information server includes information in the environment report that is independent of the environments, such as news or announcements related to the requesting client or a requested service.

The environment information server sends the environment report to the client system, block 420. The environment information server sends the report to the client through the network.

Figure 5:
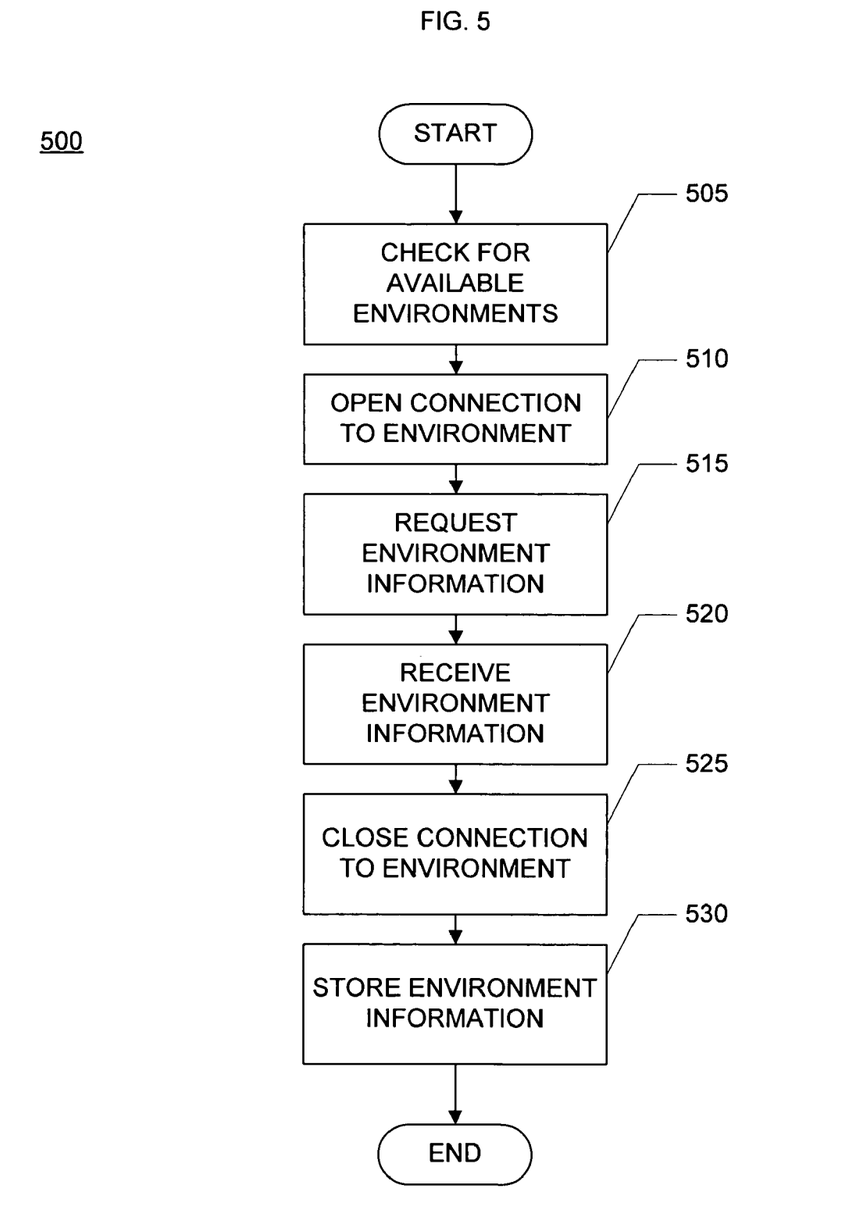
FIG. 5 is a flow chart of updating environment information in an environment information server.

FIG. 5 is a flow chart 500 of updating environment information in an environment information server. Initially, an environment information server is connected to an environment information database and connected to one or more environments through a network.

The environment information server checks the network for available environments, block 505. The environment information server maintains a list of the available environments and the network information for connecting to each available environment. Periodically, the environment information server polls the network for changes in the available environments, such as new environments becoming available or environments becoming unavailable.

Beginning with the first environment in the list of available environments, the environment information server connects to the environment, block 510. The environment information server connects to the environment through the network using the stored network information for the environment.

The environment information server requests environment information from the environment, block 515. The environment information server requests environment information according to what types of environment information are stored by the environment information server. In one implementation, the environment information server first checks the environment information stored for the environment and requests environment information from the environment for environment information which is no longer current (e.g., environment information having a timestamp more than one week old).

The environment information server receives the requested environment information from the environment, block 520. After receiving the requested environment information, the environment information server closes the connection to the environment, block 525.

The environment information server stores the received environment information in the environment information database, block 530. In one implementation, the environment information server stores or changes only the environment information that is different from the environment information already stored in the environment information database. After storing the environment information, the environment information server connects to the next environment in the list of available environments, returning to block 510. After reaching the end of the list of available environments, the environment information server waits for a predetermined period time and then once again checks for available environments, returning to block 505.

The various implementations of the invention are realized in electronic hardware, computer software, or combinations of these technologies. Some implementations include one or more computer programs executed by a programmable processor or computer. For example, referring to FIG. 1, in one implementation, the environment information server 105, the environments 115$_{1...N}$, and the client system 120 include one or more programmable processors. In general, each computer includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., mice and keyboards), and one or more output devices (e.g., display consoles and printers).

The computer programs include executable code that is usually stored in a persistent storage medium and then copied into memory at run-time. The processor executes the code by retrieving program instructions from memory in a prescribed order. When executing the program code, the computer receives data from the input and/or storage devices, performs operations on the data, and then delivers the resulting data to the output and/or storage devices.

Various illustrative implementations of the present invention have been described. However, one of ordinary skill in the art will see that additional implementations are also possible and within the scope of the present invention. For example, while the above description focuses on implementations providing online game services, other online services can be supported, such as web access, email, or financial services. In another alternative implementation, rather than the client system being a game console or personal computer system, the client system can be a consumer electronics device, such as a phone or PDA (personal digital assistant). Accordingly, the present invention is not limited to only those implementations described above.

What is claimed is:

1. A network of one or more interconnected computer systems forming an environment information server, the server comprising:
    a server controller;
    a network connection connected to said server controller;
    an environment information database connected to said server controller configured to store data for one or more network environments; and
    a request handler connected to said server controller configured to process user requests received through said network connection,
    wherein the environment information server (1) periodically polls the one or more network environments (2) maintains the environment information database with a list of available network environments and network information for connecting to each network environment, and (3) updates the environment information database with changes in the available network environments,
    wherein said request handler exchanges data with said environment information database and returns, in response to a received request, an environment report,
    wherein the environment report comprises:
    information characterizing the one or more network environments selectable by the user for connection, the information characterizing each network including user count information that indicates the current number of clients connected to the environment and the maximum number of clients allowed to be connected to the environment;
    client system dependent data derived by applying information from the environment information database to network information received from the client system, and
    latency information for a particular network environment estimated relative to a sample user to estimate latency relative to the requesting user.

2. The environment information server of claim 1, wherein:
    the data for an environment stored in said environment information database includes network information for the environment and status information for the environment.

3. The environment information server of claim 1, wherein:
    said network information indicates a name of the environment.

4. The environment information server of claim 1, wherein:
    said network information indicates a fully qualified domain name of the environment.

5. The environment information server of claim 1, wherein:
    said network information indicates a port number of the environment.

6. The environment information server of claim 1, wherein:
    said status information indicates whether the environment is available or not.

7. The environment information server of claim 1, wherein:
    said environment information also includes description information indicating information describing the environment.

8. The environment information server of claim 7, wherein:
    said description information indicates news about the environment.

9. The environment information server of claim 1, wherein:
    said request handler generates environment reports using data stored in said environment information database.

10. The environment information server of claim 9, wherein:
    said request handler customizes environment reports using client information in received requests.

11. The environment information server of claim 1, wherein:
    said environment report provides multi-lingual support.

12. The environment information server of claim 1, wherein:
    said environment information request indicates client information about said client.

13. The environment information server of claim 1, wherein:
each environment supports an on-line game.

14. The environment information server of claim 1, wherein:
said requests are received from game consoles connected to said network connection through the Internet.

15. The environment information server of claim 1, wherein:
said network connection is connected to the Internet.

16. A non-transitory computer-readable storage medium having stored thereon a computer program for use in providing environment information, the program comprising executable instructions that cause a computer to:
periodically poll one or more network environments;
maintain the environment information database with a list of available network environments and network information for connecting to each network environment;
update an environment information database with information regarding each of the one or more network environments and with changes in the available network environments,
process an environment information request from a client;
retrieve environment information for the one or more environments from the environment information database;
generate an environment report according to said retrieved environment information; and
send, in response to the client request, the environment report of network environments selectable by the client,
wherein the environment report comprises:
information characterizing the one or more network environments selectable by the user for connection, the information characterizing each network including user count information that indicates the current number of clients connected to the environment and the maximum number of clients allowed to be connected to the environment;
client system dependent data derived by applying information from the environment information database to network information received from the client system, and
latency information for a particular network environment estimated relative to a sample user to estimate latency relative to the requesting user.

17. A non-transitory computer-readable storage medium having stored thereon a computer program for use in accessing environment information, the program comprising executable instructions that cause a computer to:
send an environment information request from a client to an environment information server;
receive from said environment information server, in response to the environment information request, an environment report of network environments selectable by the client for connection,
wherein the environment information server (1) periodically polls the one or more network environments (2) maintains the environment information database with a list of available network environments and network information for connecting to each network environment, and (3) updates the environment information database with changes in the available network environments,
wherein the environment information server comprises a request handler that exchanges data with said environment information database and returns, in response to a received request, the environment report of network environments, and
wherein the environment report comprises:
information characterizing the one or more network environments selectable by the user for connection, the information characterizing each network including user count information that indicates the current number of clients connected to the environment and the maximum number of clients allowed to be connected to the environment;
client system dependent data derived by applying information from the environment information database to network information received from the client system, and
latency information for a particular network environment estimated relative to a sample user to estimate latency relative to the requesting user.

18. A method of providing environment information, comprising:
periodically polling one or more network environments;
maintaining the environment information database with a list of available network environments and network information for connecting to each network environment;
updating an environment information database with information regarding each of the one or more network environments and with changes in the available network environments,
receiving a request from a user;
retrieving environment information for the one or more environments from the environment information database;
generating an environment report according to said retrieved environment information; and
sending, in response to the user request, the environment report of network environments selectable by the user,
wherein the environment report comprises:
information characterizing the one or more network environments selectable by the user for connection, the information characterizing each network including user count information that indicates the current number of clients connected to the environment and the maximum number of clients allowed to be connected to the environment;
client system dependent data derived by applying information from the environment information database to network information received from the client system, and
latency information for a particular network environment estimated relative to a sample user to estimate latency relative to the requesting user.

19. The method of claim 18, wherein:
said network information indicates a name of the environment.

20. The method of claim 18, wherein:
said network information indicates a fully qualified domain name of the environment.

21. The method of claim 18, wherein:
said network information indicates a port number of the environment.

22. The method of claim 18, wherein:
said status information indicates whether the environment is available or not.

23. The method of claim 18,
wherein environment information for an environment includes network information for the environment and status information for the environment.

24. The method of claim 18, wherein:
said client is a game console.

25. The method of claim 18, wherein:
said environment information also includes description information indicating information describing the environment.

26. The method of claim 25, wherein:
said description information indicates news about the environment.

27. The method of claim 18, wherein:
said environment report provides multi-lingual support.

28. The method of claim 18, wherein:
said environment information request indicates client information about said client.

29. The method of claim 28, wherein:
said environment report is customized according to said client information.

30. The method of claim 18, wherein:
said network connection is connected to the Internet.

31. A method of accessing environment information, comprising:
sending an environment information request from a client to an environment information server;
receiving from said environment information server, in response to the environment information request, an environment report of network environments selectable by the client for connection,
wherein the environment information server (1) periodically polls the one or more network environments and (2) maintains the environment information database with a list of available network environments and network information for connecting to each network environment, and (3) updates the environment information database with changes in the available network environments,
exchanging data with said environment information database to return to the client, in response to a received request, the environment report,
wherein the environment report comprises:
information characterizing the one or more network environments selectable by the user for connection, the information characterizing each network including user count information that indicates the current number of clients connected to the environment and the maximum number of clients allowed to be connected to the environment;
client system dependent data derived by applying information from the environment information database to network information received from the client system, and
latency information for a particular network environment estimated relative to a sample user to estimate latency relative to the requesting user.

32. The method of claim 31, further comprising:
said client is a game console.

33. The method of claim 31, further comprising:
connecting said client to a data network;
establishing said network connection between said client and said environment information through said data network;
closing said network connection to said environment information server after receiving said environment report.

34. The method of claim 31, further comprising:
presenting said environment report through said client.

35. The method of claim 31, further comprising:
selecting an environment according to said environment report.

36. The method of claim 35, further comprising:
establishing a second network connection to said selected environment.

37. The method of claim 36, further comprising:
accessing an online game using said selected environment.

38. The method of claim 31, further comprising:
said environment information request indicates client information about said client.

39. The method of claim 38, further comprising:
said environment report is customized according to said client information.

40. The method of claim 31, further comprising:
said network information indicates a name of the environment.

41. The method of claim 31, further comprising:
said network information indicates a fully qualified domain name of the environment.

42. The method of claim 31, further comprising:
said network information indicates a port number of the environment.

43. The method of claim 31, further comprising:
said status information indicates whether the environment is available or not.

44. The method of claim 31,
wherein environment information for an environment includes network information for the environment and status information for the environment.

45. The method of claim 31, further comprising:
said network connection is to the Internet.

46. The method of claim 31, further comprising:
said environment information also includes description information indicating information describing the environment.

47. The method of claim 46, further comprising:
said description information indicates news about the environment.

48. The method of claim 31, further comprising:
said environment report provides multi-lingual support.

* * * * *